(12) United States Patent
Okabe et al.

(10) Patent No.: US 8,089,512 B2
(45) Date of Patent: Jan. 3, 2012

(54) DRIVING SUPPORT DEVICE, DRIVING SUPPORT METHOD AND COMPUTER PROGRAM

(75) Inventors: Hidefumi Okabe, Nisshin (JP); Tomoyuki Kokuryuu, Nagoya (JP); Minoru Takagi, Okazaki (JP)

(73) Assignee: Aisin AW Co., Ltd., Anjo-shi (JP)

( * ) Notice: Subject to any disclaimer, the term of this patent is extended or adjusted under 35 U.S.C. 154(b) by 646 days.

(21) Appl. No.: 12/232,414

(22) Filed: Sep. 17, 2008

(65) Prior Publication Data

US 2009/0086019 A1    Apr. 2, 2009

(30) Foreign Application Priority Data

Oct. 2, 2007   (JP) ................. 2007-258641

(51) Int. Cl.
*H04N 7/00* (2006.01)
*H04N 7/18* (2006.01)
(52) U.S. Cl. .................... 348/118; 348/116; 348/148
(58) Field of Classification Search .................... None
See application file for complete search history.

(56) References Cited

U.S. PATENT DOCUMENTS

| 6,366,221 | B1 * | 4/2002 | Iisaka et al. | 340/932.2 |
| 6,809,704 | B2 * | 10/2004 | Kulas | 345/1.2 |
| 7,825,953 | B2 * | 11/2010 | Kato et al. | 348/148 |
| 2003/0108222 | A1 | 6/2003 | Sato et al. | |
| 2003/0151563 | A1 | 8/2003 | Kulas | |
| 2005/0168695 | A1 | 8/2005 | Ooba et al. | |
| 2007/0072154 | A1 * | 3/2007 | Akatsuka et al. | 434/69 |
| 2008/0012938 | A1 * | 1/2008 | Kubota et al. | 348/118 |
| 2008/0204557 | A1 * | 8/2008 | Kubota et al. | 348/148 |
| 2010/0060735 | A1 * | 3/2010 | Sato | 348/148 |

FOREIGN PATENT DOCUMENTS

| JP | 2005-184225 | 7/2005 |
| JP | 2006-135797 | 5/2006 |
| JP | 2006-290304 | 10/2006 |
| JP | 2006-303583 | 11/2006 |
| WO | WO 2006/027563 | 3/2006 |

* cited by examiner

*Primary Examiner* — John B. Walsh
(74) *Attorney, Agent, or Firm* — Bacon & Thomas, PLLC

(57) ABSTRACT

A driving support device, a driving support method, and a computer program provide an image of the peripheral environment of a vehicle which is captured by a camera. The traveling state of the vehicle is obtained and, based on same, a blind spot region for a driver created by a right front pillar, as it would appear after a predetermined period of time, is calculated by taking into consideration the time lag between capture of an image by the camera and projection of that image by a projector. An image corresponding to the calculated blind spot region is extracted from the image captured by the camera, and the extracted image is projected onto the inside surface of the right front pillar.

5 Claims, 11 Drawing Sheets

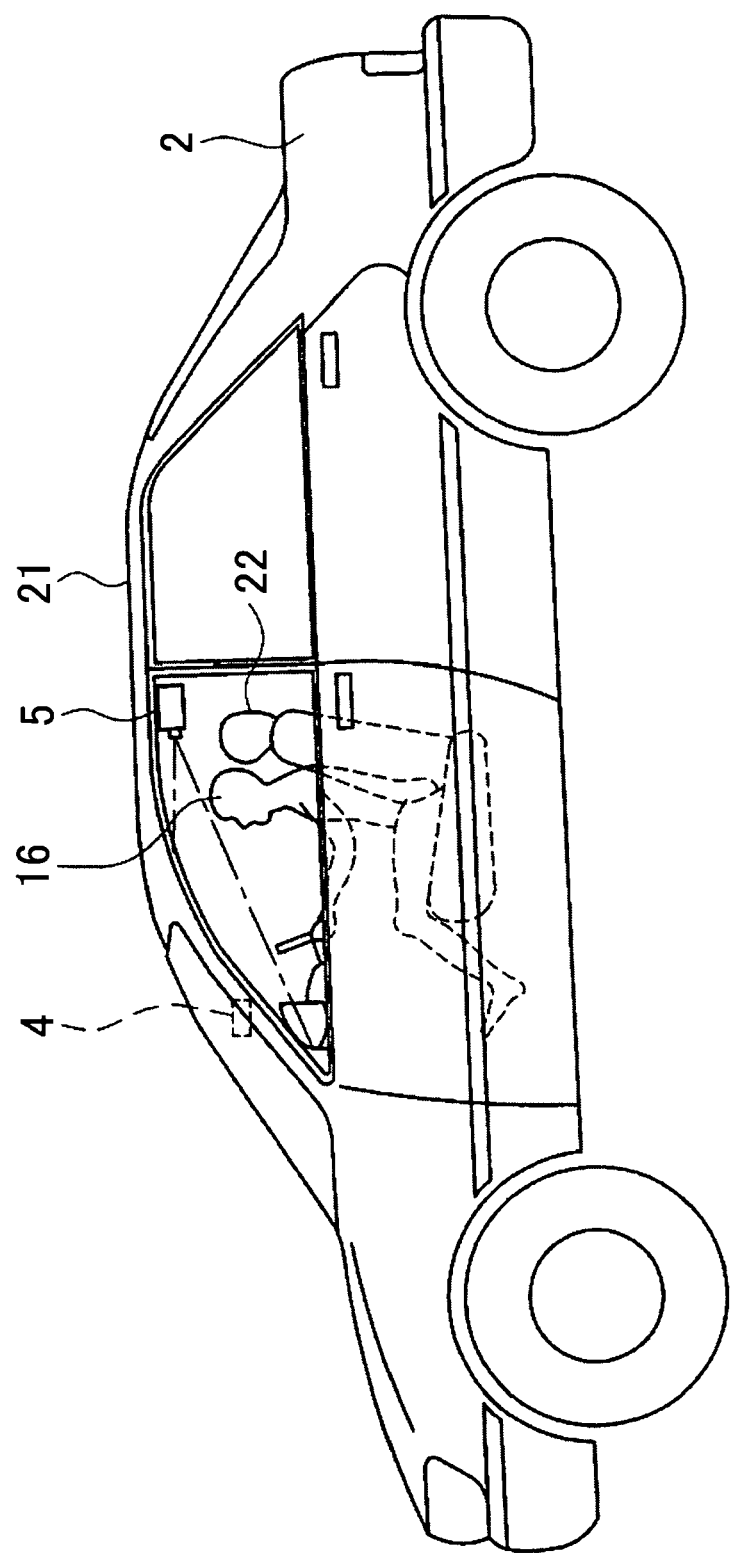

F I G . 10
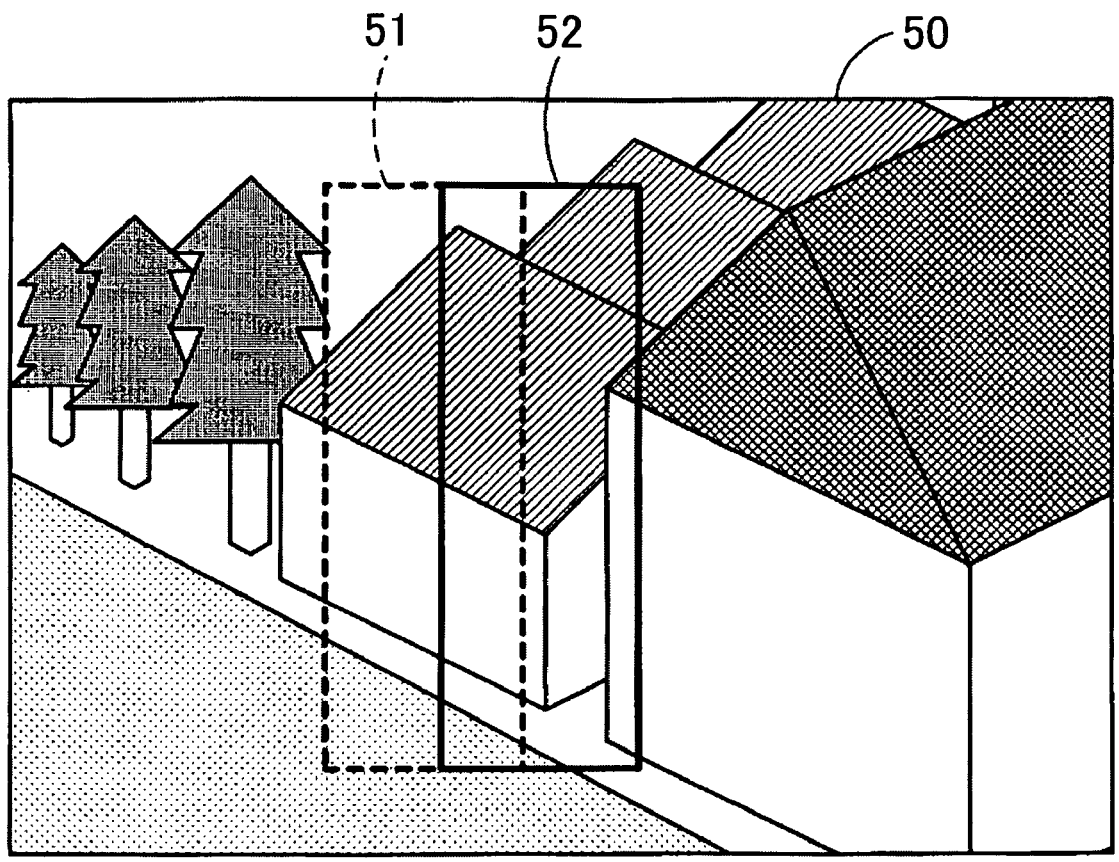

DRIVING SUPPORT DEVICE, DRIVING SUPPORT METHOD AND COMPUTER PROGRAM

INCORPORATION BY REFERENCE

The disclosure of Japanese Patent Application No. 2007-258641 filed on Oct. 2, 2008 including the specification, drawings and abstract is incorporated herein by reference in its entirety.

BACKGROUND OF THE INVENTION

1. Field of the Invention

The present invention relates to a driving support device, a driving support method and a computer program for compensating for lack of visibility in a of blind spot of the driver of a vehicle.

2. Description of the Related Art

In recent years, along with the popularization of navigation systems, there has been an increasing use of vehicle image display systems for displaying circumstances around the periphery of a vehicle on interior display devices. For example, positions of other vehicles, obstacles, road markings such as a center line and a stop line, and the like might be displayed.

Here, an area on the periphery of the vehicle which a driver cannot view is the so-called blind spot region. For example, regions to the rear of a vehicle, in the direction of a front pillar, under a front bumper, and the like, are among the blind spot regions of the vehicle. Usually, it is difficult for a driver to view such a blind spot region, which delays or prevents recognition of pedestrians or obstacles close to the vehicle. Accordingly, in order to assist the driver, views of these blind spot regions are captured by an imaging device such as a camera on the vehicle and displayed on a display device mounted in the vehicle interior while the vehicle is traveling or stopped.

For instance, a technique for capturing images of areas, including blind spots created by pillars which support a ceiling of a vehicle, using cameras set on door mirrors, correcting the data for the captured images based on coordinates of a driver's eye, coordinates of the pillars, coordinates of the cameras and direction of the optical axis of the camera, and displaying the corrected image on each of the pillars, using a projector, is disclosed in, for example, Japanese Patent Application Publication No. JP-A-2005-184225 (pages 8 to 11, FIG. 6).

SUMMARY OF THE INVENTION

However, the system disclosed in the aforementioned Japanese Patent Application Publication No. JP-A-2005-184225 has a time lag between the point in time when the image is captured by the camera and a point in time when the captured image is displayed on the corresponding pillar. Specifically, image capturing by the camera, image processing of the captured image, and processing for display of the respective pillars, requires at least a certain period of time, so that it is impossible to display the image captured by the camera at the same time that image is captured. Therefore, the image actually displayed becomes an image of a region different from that of the blind spot. As a result, actual blind spot regions and image regions displayed on the respective pillars differ, which can lead the driver to make erroneous judgments.

Accordingly, an objective of the present invention is to solve the aforementioned problems of the related art, and to provide a driving support device, a driving support method and a computer program capable of accurately displaying the actual blind spot region of a vehicle even when there is a time lag between the point in time when the image is captured and the point in time when the captured image is displayed, by extracting an image, corresponding to the blind spot region of the vehicle after a predetermined period of time from when the captured image was captured, and outputting the extracted image.

As noted above, the driving support device of the present invention makes it possible to accurately display an actual blind spot region of a vehicle even when there is a time lag between, for example, the point in time when an image is captured and the point in time when the captured image is displayed, by extracting an image corresponding to the blind spot region of the vehicle after a predetermined period of time from when the image is captured and outputting the captured image. Accordingly, actual circumstances around the periphery of the vehicle and the display of the periphery of the vehicle will not differ from each other, enabling a driver to make appropriate judgments.

Since a location of a vehicle after a predetermined period of time is predicted, and a blind spot region for that predicted location is calculated, it becomes possible to appropriately extract an image of an area or the periphery of the vehicle after the predetermined period of time, from a captured image.

By taking into consideration the time lag between the point in time an image is captured and a point in time when the captured image is output, it becomes possible to appropriately display peripheral circumstances of a vehicle as of the current point in time when the image is displayed, without the actual peripheral circumstances and the displayed peripheral circumstances differing from each other.

By display of an image corresponding in particular to a blind spot region created by a pillar of a vehicle, the driving safety is improved by increasing the visibility for the driver. Further, by visually recognizing the projected image, the driver can more accurately access of an object located in the blind spot.

BRIEF DESCRIPTION OF THE DRAWINGS

FIG. 1 is an exterior view of a vehicle 2, having mounted thereon an embodiment of a driving support device according to the present invention;

FIG. 10 is a view showing an image range to be extracted in step 5; and

DETAILED DESCRIPTION OF THE PREFERRED EMBODIMENTS

Hereinafter, an embodiment of a driving support device according to the present invention will be described with reference to the drawings. The driving support device 1 of the present embodiment described hereinbelow is a device in which an image corresponding to a blind spot region of a vehicle is captured by a camera mounted on the exterior of a vehicle and is displayed to a driver in the vehicle, and a blind spot region created by a front pillar of the vehicle is particularly targeted as the blind spot region of the vehicle to be imaged and displayed. Further, as the method of displaying the image corresponding to the blind spot region, projecting the image on the inside interior of the front pillar by a projector is adopted in the present embodiment.

Figure 2A:
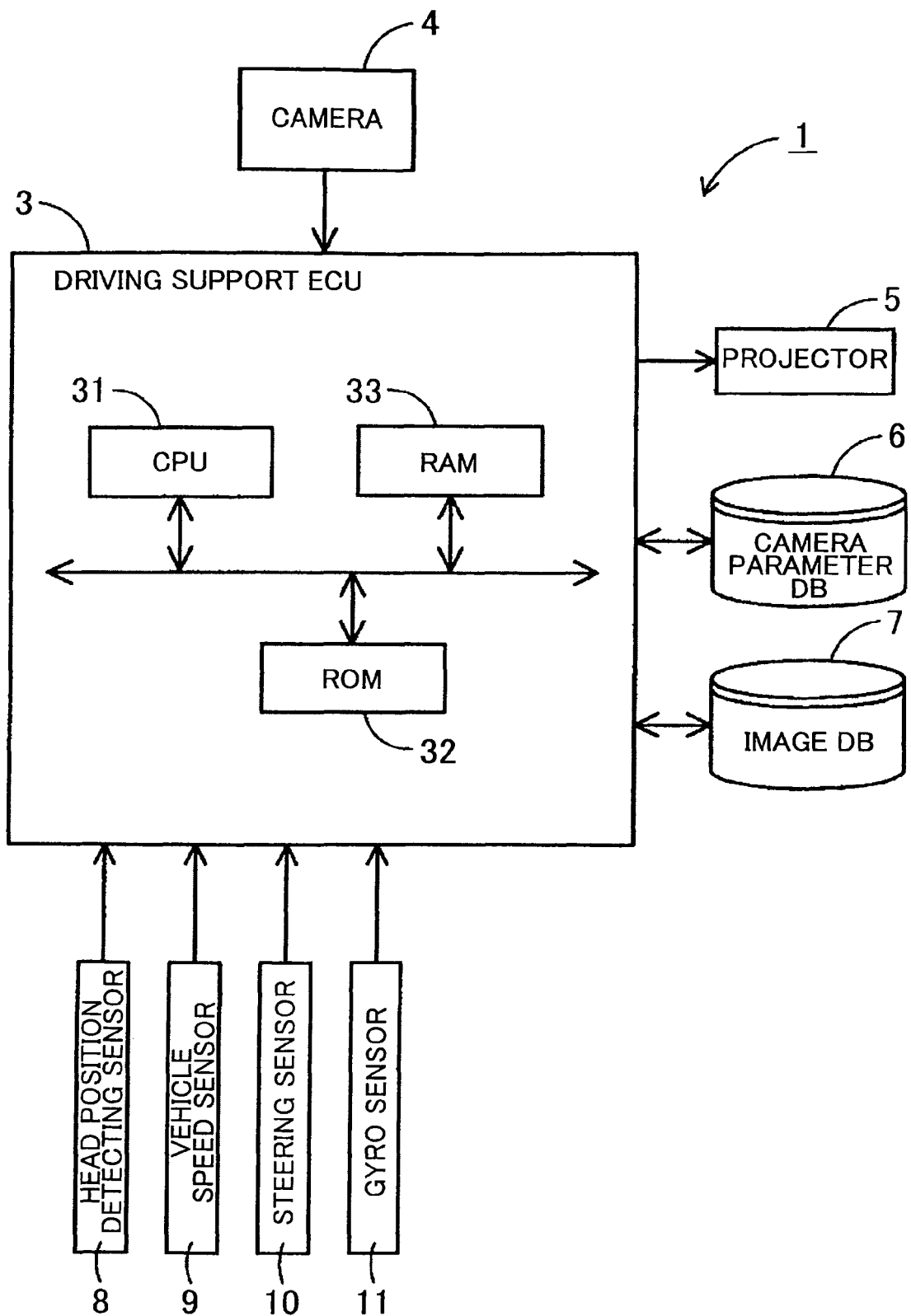
FIG. 2A is a block diagram of a control system of an embodiment of the driving support device according to the present invention.
Figure 2B:
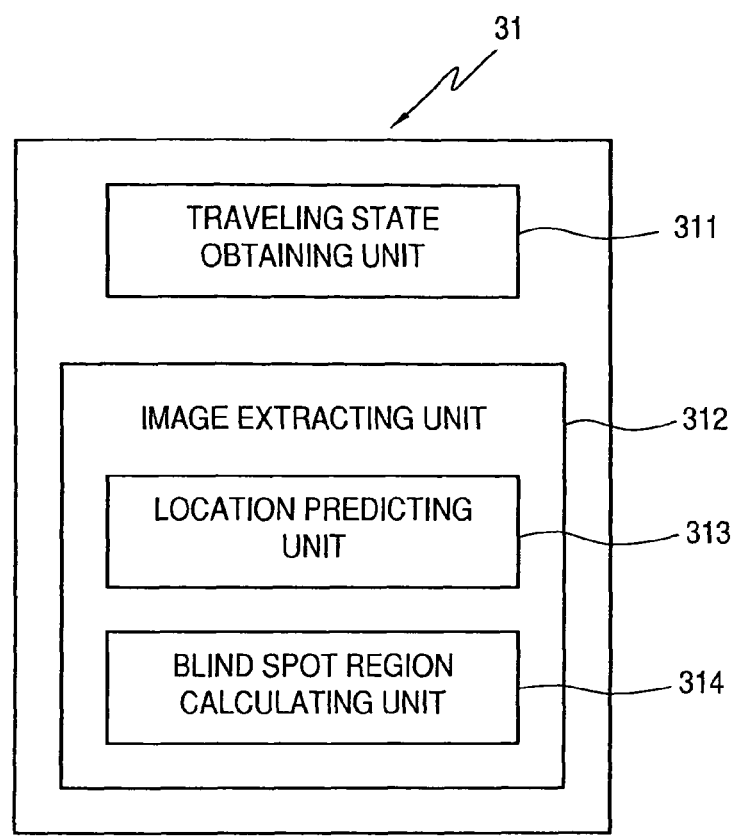
FIG. 2B a block diagram of the CPU shown in FIG. 2A.

As shown in FIG. 1, FIG. 2A and FIG. 2B, the driving support device 1 according to the present embodiment has a driving support ECU 3 (including CPU 31 serving as a traveling state obtaining unit 311, an image extracting unit, an image outputting unit 312, a location predicting unit 314, and a blind spot region calculating unit 314), a camera (imaging unit) 4, a projector 5 (image outputting unit), a camera parameter database DB 6, an image DB 7, a head position detecting sensor 8, a vehicle speed sensor 9, a steering sensor 10, and a gyro sensor 11, all mounted in/on the vehicle 2.

Figure 6:
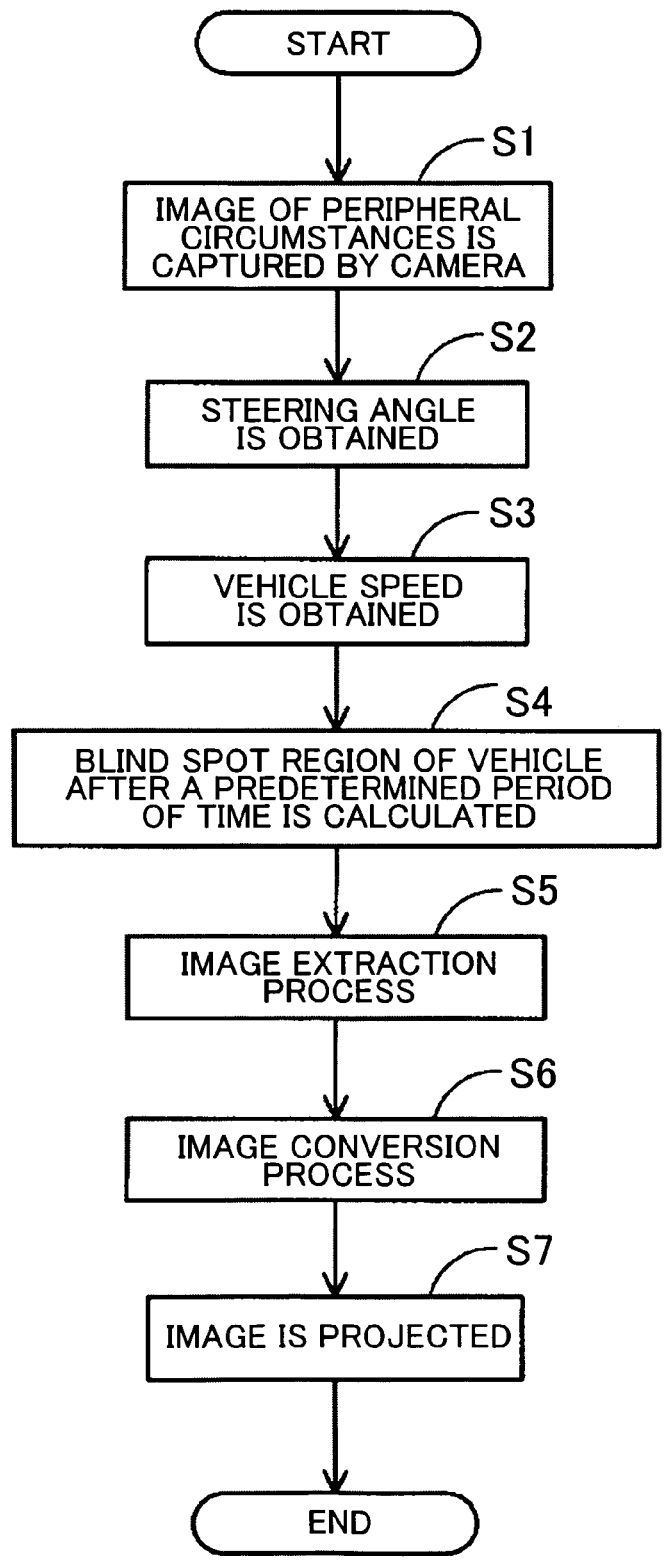
FIG. 6 is a flow chart of an image projection processing program according to an embodiment of the present invention.

The driving support ECU (electronic control unit) 3 is an electronic control unit which extracts an image corresponding to a blind spot region created by a right front pillar 12 from an image captured by the camera 4, and projects the extracted image onto the inside of the right front pillar 12 using the projector 5, thereby executing image projection processing (refer to FIG. 6). Note that the driving support ECU 3 may also serve as an ECU for controlling a navigation device. The specific structure of the driving support ECU 3 will be described later.

Figure 3:
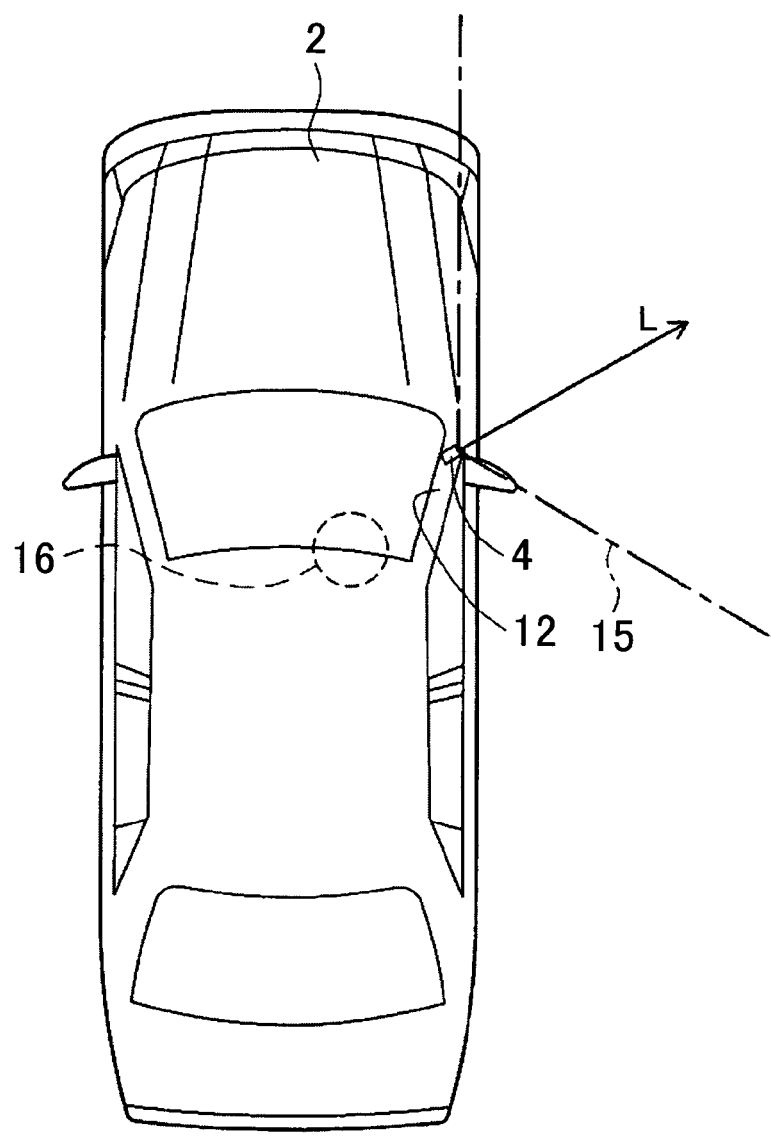
FIG. 3 is a plan view showing a mounting position of a camera.

The camera 4 has a fixed imaging element such as a CCD, for example, and is attached to the outside of the right front pillar 12 of the vehicle 2 with its optical axis L directed downward at a predetermined angle with respect to the horizontal. Further, as shown in FIG. 3, the optical axis L of the camera 4 is directed in a right forward direction relative to the vehicle 2, and a predetermined range around the optical axis direction L as its center is set as a captured region 15 in which an image of a peripheral environment can be captured by the camera 4. The camera 4 captures an image in the right forward direction of the vehicle 2 when the vehicle 2 travels or stops, and the captured image (refer to FIG. 10) is stored in the image DB 7. Thereafter, as will be described later, a range image corresponding to the blind spot region created by the right front pillar 12 is extracted from the captured image, and projected on the inside of the right front pillar 12 by the projector 5 (refer to FIG. 11). Note that in the present embodiment, the optical axis L is set to be in the same direction as the direction of visual recognition of the right front pillar 12 as seen from a driver 16 (namely, the direction of the blind spot region created by the right front pillar 12 as seen from the driver 16).

The projector 5 is preferably a so-called liquid crystal projector formed of a liquid crystal panel and a light source used for projection. In the driving support device 1 of the present embodiment, the projector 5 projects the image of the blind spot region created by the right front pillar 12 onto on the inside of the right front pillar 12.

Figure 4:
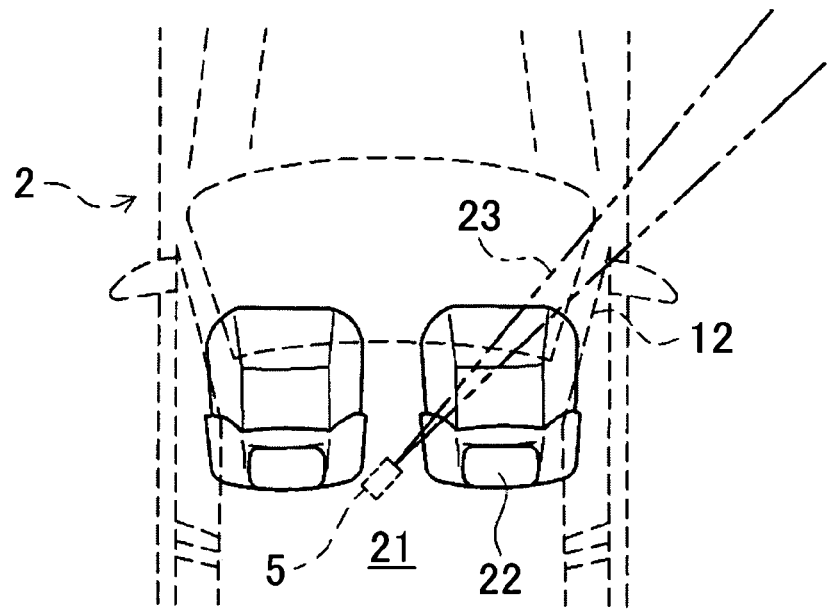
FIG. 4 is a schematic plan view showing a mounting position of a projector.
Figure 5:
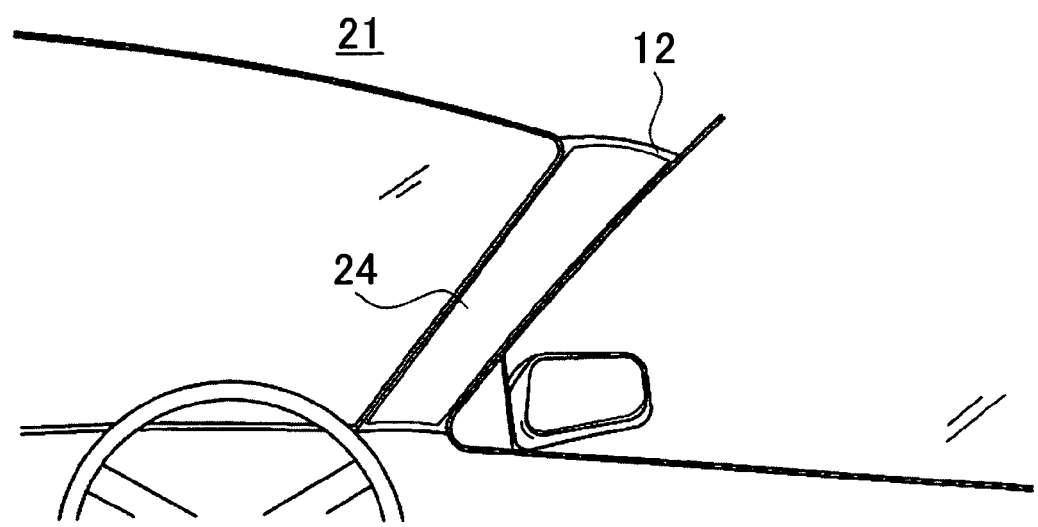
FIG. 5 is a perspective view of a right front pillar of a vehicle.

As shown in FIG. 1 and FIG. 4, the projector 5 is mounted on the interior of the roof 21 and in the vicinity of vertically above the front seat 22 occupied by the driver 16. Further, as shown in FIG. 5, a screen 24 cut to the shape of the pillar is adhered to the interior surface of the right front pillar 12. Furthermore, the focal point of the projector 5 is adjusted to the screen 24 such that a projection range of the projector 5 is set to match the projection plane of the screen 24. As will be described later, by projecting the image using the projector 5, an image as if seen through the right front pillar 12 is displayed on the right front pillar 12 (refer to FIG. 11). Instead of the liquid crystal projector, a DLP projector or an LCOS projector may be used as the projector 5. Further, when the inside surface of the right front pillar 12 is formed of a material and a shape that allow a clear image to be displayed by the projector 5, the screen 24 may be omitted.

The camera parameter DB 6 is a storage unit containing, stored therein various parameters regarding the camera 4. For instance, in the present embodiment, the camera parameter DB 6 stores information regarding setting position, setting angle, imaging range, shooting plane or "image plane" (refer to FIG. 7) and the like of the camera 4 relative to the vehicle 2. The driving support ECU 3 extracts the image corresponding to the blind spot region created by the right front pillar 12 from the image captured by the camera 4 in accordance with the various parameters stored in the camera parameter DB 6.

The image DB 7 is a storage unit for storing the image captured by the camera 4. The driving support ECU 3 executes predetermined image processing on the captured image stored in the image DB 7, to thereby produce projection data to be projected by the projector 5.

The head position detecting sensor 8 is formed of a plurality of ultrasonic sensors mounted around the periphery of the driver 16 seated in the front seat 22 in the interior of the vehicle 2, at a position substantially the same height as the head of the driver 16 or at a slightly higher position. When an ultrasonic wave transmitted from a head position detecting sensor 8 reflects off the head of the driver 16, the driving support ECU 3 measures the period of time from when the ultrasonic wave is transmitted to when a reflected wave is received, to thereby detect the position of the head. Subsequently, in the present embodiment, the driving support ECU 3 calculates the blind spot region of the vehicle based on the detected head position.

The vehicle speed sensor 9 is a sensor for measuring distance traveled and vehicle speed and generates pulses in accordance with rotation of the wheels of the vehicle 2, and outputs these pulse signals to the driving support ECU 3. Subsequently, by counting the number of generated pulses, the driving support ECU 3 calculates rotational speed of the wheels and the distance traveled.

The steering sensor 10 is a sensor mounted inside a steering mechanism and capable of detecting pivot angle of the steering mechanism.

The gyro sensor 11 is a sensor which detects the turning angle of the vehicle 2. Further, by integrating the turning angle detected by the gyro sensor 11, it is possible to detect a vehicle direction.

As shown in FIG. 2, the driving support ECU 3 is formed of a CPU 31 as its core element, with a ROM 32 and a RAM 33 (storage units) connected to the CPU 31. The ROM 32 stores an image projection processing program (refer to FIG. 6), and, in addition, various programs for controlling the camera 4, the projector 5, etc. The RAM 33 is a memory element for temporarily storing various data operated on by the CPU 31, i.e. a working memory.

FIG. 6 is a flow chart of the image projection processing program utilized in the present embodiment. The image projection processing program is repeatedly executed at a predetermined internal of time (every 200 ms, for instance) after the ignition of the vehicle 2 is turned on or after a predetermined operation is performed by a user through an operation panel (not shown). The image projection processing extracts the image corresponding to the blind spot region created by the right front pillar 12 from the image captured by the camera 4 when the vehicle 2 travels or stops, and projects the extracted image onto the interior surface of the right front pillar 12 using the projector 5. The programs to be described below, shown by the flow chart in FIG. 6, are stored in the ROM 32 and the RAM 33 included in the driving support ECU 3, and are executed by the CPU 31.

In the image projection processing program, in step (hereinafter, abbreviated as S) 1, the CPU 31 first captures an image of the peripheral environment in the right forward direction in the traveling direction of the vehicle using the camera 4, to thereby obtain a captured image. Subsequently, the obtained captured image is temporality stored in the image DB 7.

Next, in S2, the CPU 31 obtains the steering angle of the vehicle based on the signal from the steering sensor 10. Further, in S3, the CPU 31 obtains the vehicle speed of the vehicle based on the signal from the vehicle speed sensor 9. Note that the aforementioned steps S2 and S3 correspond to processes conducted by the traveling state obtaining unit 311. Thus, CPU (computer) 31, programmed to execute steps S2 and S3, forms the traveling state obtaining unit 311.

Subsequently, in S4, the CPU 31 predicts the location where the vehicle will be after a predetermined period of time using the traveling state information obtained in steps S2 and S3, and then calculates the blind spot region of the vehicle at the predicted location. Note that the predetermined period of time is that period of time beginning with the capturing of the image of the peripheral environment using the camera 4 and ending with the output of the captured image using the projector 5 (namely, the display of the captured image on the screen 24), and is determined taking into account the performance of the camera 4 and the CPU 31. For example, a value of 100 ms for that predetermined time is assumed in the present embodiment.

Figure 7:
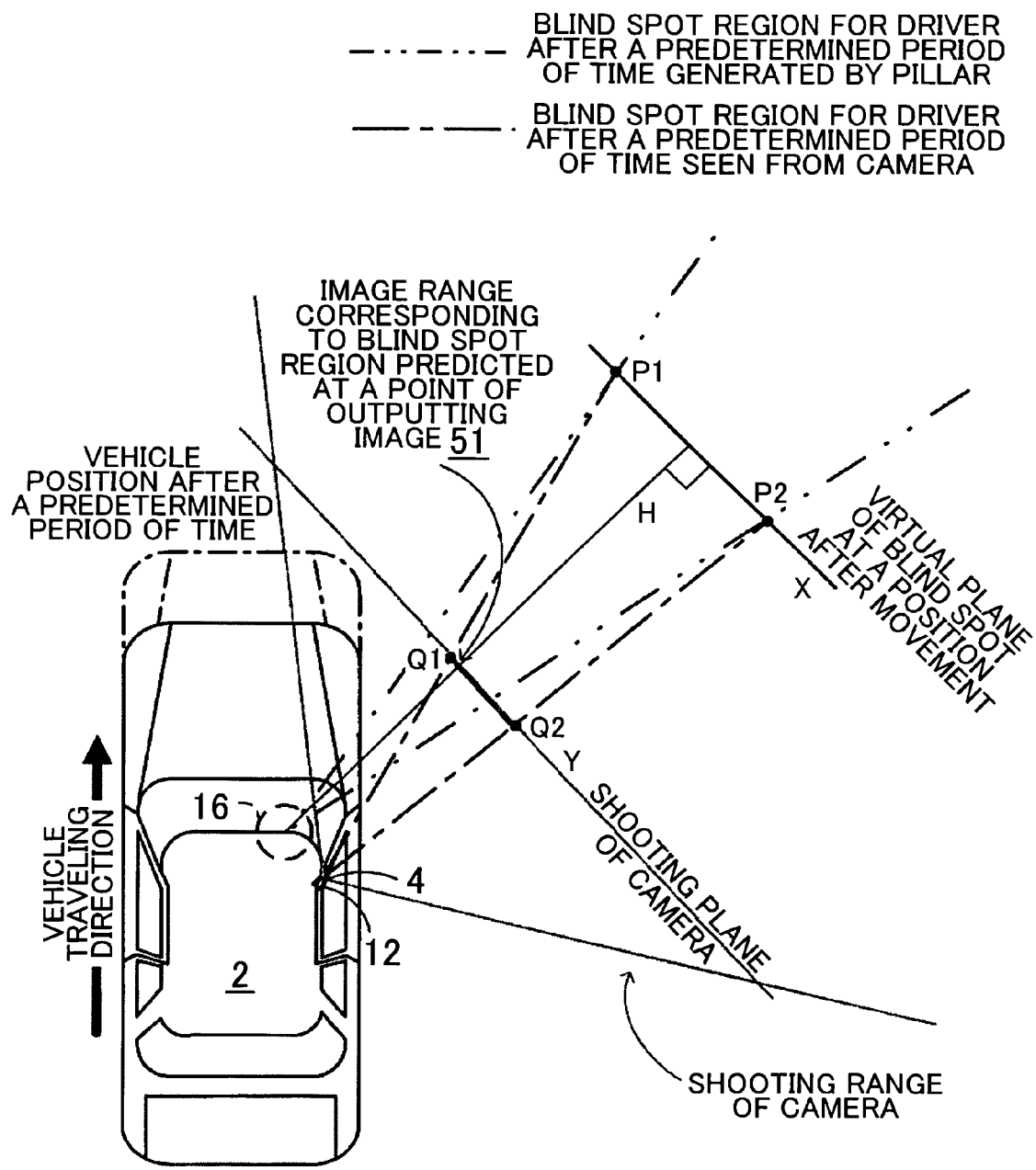
FIG. 7 illustrates change in location of the blind spot region of a vehicle as the vehicle travels straight ahead.
Figure 8:
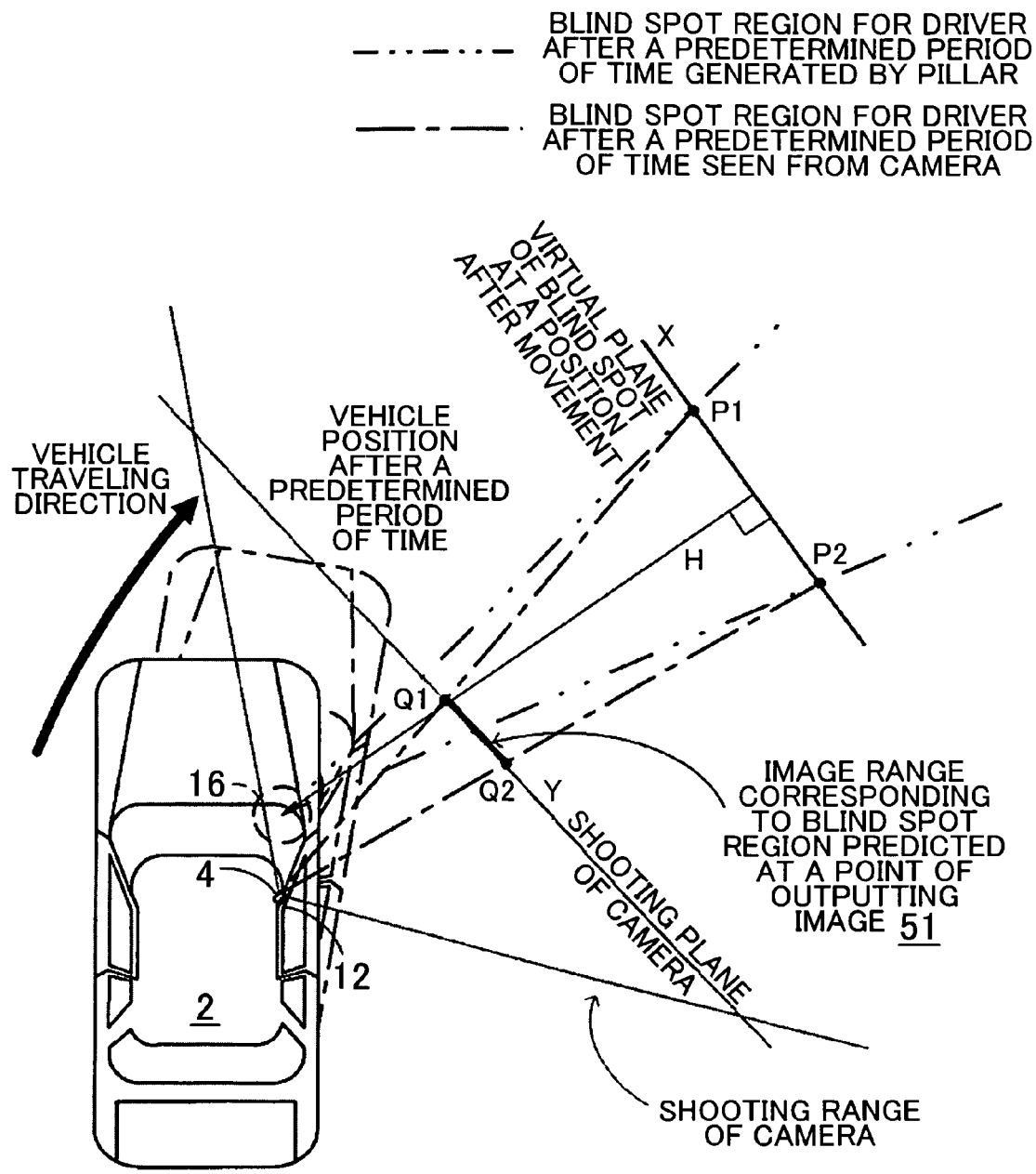
FIG. 8 illustrates change in location of the blind spot region of a vehicle when the vehicle turns right.
Figure 9:
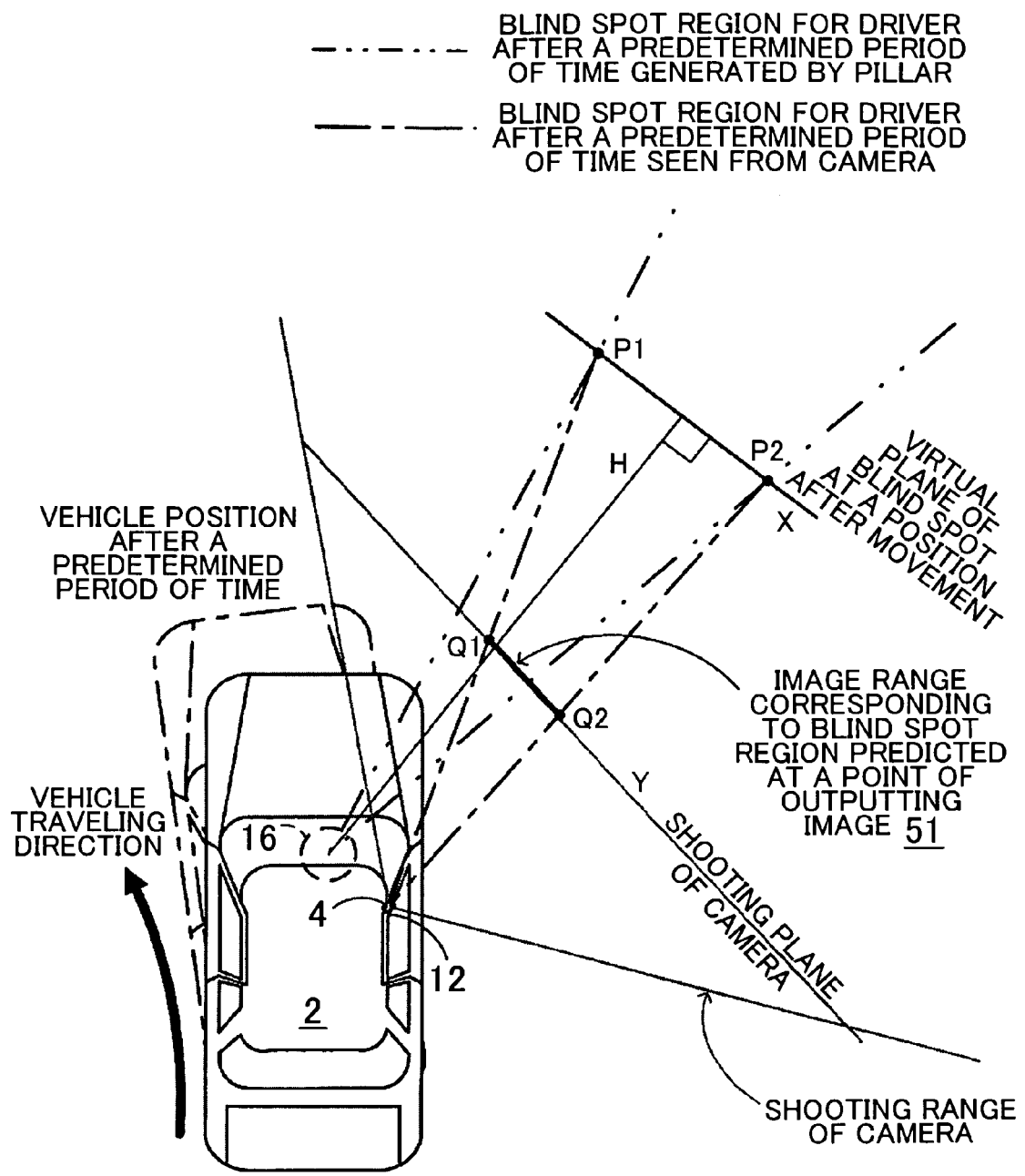
FIG. 9 illustrates change in location of the blind spot region of a vehicle when the vehicle turns left.

The process of calculating the blind spot region of the vehicle at the predetermined future time (namely, at the end of the predetermined point in time when the captured image is to be displayed) S4 will be now be described with reference to FIG. 7 to FIG. 9. Note that FIG. 7 shows a case where the vehicle 2 goes straight, FIG. 8 shows a case where the vehicle 2 turns right, and FIG. 9 shows a case where the vehicle 2 turns left. Thus, programmed to execute step S4, in the manner described below with reference to FIGS. 7-9, the CPU 31 forms the blind spot region calculating unit 314.

First, in S4, the CPU 31 detects the position of the head of the driver 16 using the head position detecting sensor 8. Next, the CPU 31 predicts the vehicle location after the predetermined period of time based on the traveling state of the vehicle obtained in S2 and S3. Further, based on the predicted vehicle location, the CPU 31 predicts the head of the driver 16 as the end of the predetermined period of time.

Subsequently, based on the prediction of the head position of the driver 16 after the predetermined period of time and the position and the shape of the right front pillar 12 relative to the head position of the driver 16, the CPU 31, operating as blind spot region calculating unit 314, calculates the blind spot region for the driver 16 after the predetermined period of time, i.e. the blind spot created by the right front pillar 12. Note that as shown in FIG. 7 to FIG. 9, the blind spot region for the driver 16 created by the right front pillar 12 at the location arrived at after the predetermined period of time (namely, the point in time when the captured image is displayed) differs from that at the current position (namely, the location where the image is captured) on a travel route of the vehicle. S4 corresponds to processes conducted by the location (position) predicting unit 313 and the blind spot region calculating unit 314.

Thereafter, in S5, the CPU 31 specifies a range for the image corresponding to the blind spot region calculated in the aforementioned S4 within the image captured in S1, and extracts that specified image range. Here, FIG. 10 is a view showing an image 50 captured by the camera 4.

Hereinafter, extraction processing of the image, executed in S5, will be described with reference to FIGS. 7 to 10.

First, in S5, the CPU 31 sets a virtual plane X for the location to be arrived at when the predetermined period of time ends, based on the pillar blind spot region for the driver 16 after the predetermined period of time, calculated in the aforementioned S4 as shown in FIG. 7 to FIG. 9. Here, the virtual plane X is a plane for correcting a mismatch between the visibility of the camera 4 and the visibility of the driver 16, and is a virtual surface set in accordance with the visibility of the driver in which the visibility of the driver 16 is determined as the origin. Note that the virtual plane X is orthogonal to a line H extending from the predicted head position of the driver 16 through the center of the right front pillar 12, and is set as a predetermined distance (10 m, for instance) apart from the vehicle 2.

Thereafter, the CPU 31 obtains an image (shooting) plane for camera Y. Note that the image plane Y of the camera is predetermined based on design (resolution, angle set relative to the vehicle body, and so on) of the camera 4, and is stored in the camera parameter DB 6. The camera 4 focuses on the image plane Y of the camera to capture the image in S1.

Subsequently, the CPU 31 calculates regions P1 to P2 of overlap between the blind spot region for the driver 16 after the predetermined period of time calculated in S4 and the virtual plane X. The CPU 31 calculates a visibility region in which the calculated overlap regions P1 to P2 match the view of the camera 4 (namely, the blind spot region for the driver after the predetermined period of time, as seen through the camera), and specifies regions Q1 to Q2 in which the calculated visibility region and the image plane Y of the camera overlap as an image range 51 corresponding to the blind spot region of the vehicle 2 after the predetermined period of time (the point in time when the captured image is displayed).

Subsequently, an image of the specified image range 51 is extracted from the captured image 50, as shown in FIG. 10.

Note that the image range 52 corresponding to the blind spot region of the vehicle 2 at the current (namely, at a point in time when the image is captured by the camera) location is also shown in FIG. 10. As shown in FIG. 10, the image range to be extracted is a region different from the blind spot region of the vehicle 2 at the current position, so that it is possible to accurately extract the blind spot region of the vehicle for the point in time when the image is output. S4 and S5 are the processes executed by the image extracting unit 312. Thus, CPU 31, programmed to execute steps S4 and S5, in the manner described above with reference to FIGS. 7-10, forms the image extracting unit 312.

Next, in S6, the CPU 31 executes a projection conversion of the image extracted in S5 and projects the converted image onto the virtual plane, thereby generating projection data.

Hereinafter, the image conversion processing executed in S6 will be specifically explained with reference to FIG. 7 to FIG. 9.

First, in S6, the CPU 31 performs the projection conversion of the image extracted in S5 to project it on the virtual plane X. The projection conversion is a process for performing a coordinate transformation in which coordinates of each pixel of the image in the image range 51 within the image plane of the camera Y are transformed to the pixels of the virtual plane X, and is conducted using a conventional coordinate transformation.

Further, the image being projection-converted on the virtual plane X is thereby converted in accordance with the shape of the right front pillar 12 stored in the ROM 32, and the converted image is further coordinate-transformed in accordance with the position of the projector 5, in preparation for projection by the projector 5. Here, the image to be displayed on the inside surface of the right front pillar 12 is distorted, enlarged or reduced depending on the angle at which the light output from the projector 5 is incident on the interior surface of the pillar. Therefore, for example, a map or the like in which the coordinates of the respective pixels of the projection-converted image and the coordinates of the respective pixels of the image to be output to the projector 5 are previously correlated with each other and prestored in a memory, and based on the map, the projection-converted image is further coordinate-transformed to obtain an output image, i.e. an image for output by the projector 5. Subsequently, the coordinate-transformed image is set as projection data to be output to the projector 5.

Figure 11:
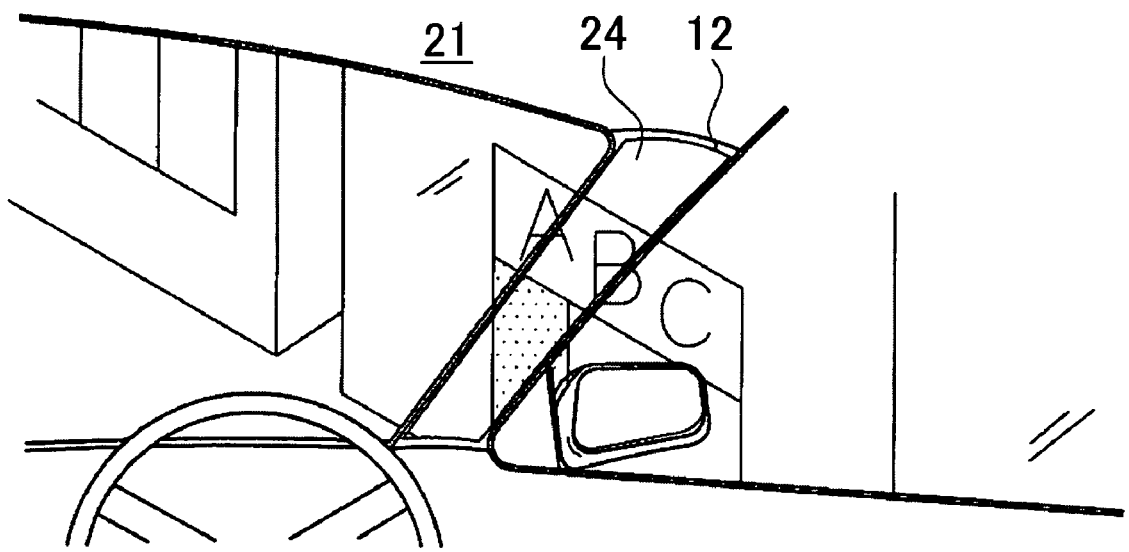
FIG. 11 is a view showing scenery within sight from the driver's seat of a vehicle after projection processing of an image.

Subsequently, in S7, the CPU 31 outputs the generated projection data from the projector 5, thereby projecting the image of the region being blocked by the pillar onto the screen 24 mounted on the inside surface of the right front pillar 12. At this time, the projected image displayed on the screen 24 is projection-converted onto the virtual plane X, so that the projected image is displayed without distortion, i.e. without deviation or inclination relative to the background visually recognized through a front window or a door window, as shown in FIG. 11.

Therefore, even when an object such as a pedestrian or an approaching vehicle is present in the blind spot, i.e. in the location hidden by the right front pillar 12, the driver 16 of the vehicle 2 is alerted to that danger. Further, an image as if seen through the right front pillar 12 is formed with more realism, which enables the driver to more accurately learn the state of the object located in the blind spot. Note that S7 corresponds to the processes conducted by the image outputting unit (projector 5).

As has been described above in detail, in the driving support device 1, the driving support method conducted by the driving support device 1, and the computer program executed in the driving support device 1 according to the present embodiment, the image of a peripheral area of the vehicle 2 is captured by the camera 4 (S1), the traveling state of the vehicle 2 is obtained (S2 and S3), the blind spot region as will be seen by the driver after the predetermined period of time is calculated taking into consideration the time lag between the time the image is captured by the camera 4 and the time that an image is projected by the projector 5 (S4), the image corresponding to the calculated (predicted) blind spot region is extracted from the image captured by the camera 4 (S5), and the extracted image is projected onto the inside surface of the right front pillar 12 using the projector 5 (S7), so that not withstanding the aforementioned time lag, it becomes possible to accurately display the actual real time blind spot region of the vehicle. Accordingly, the actual peripheral circumstances of the vehicle 2 and the peripheral circumstances of the vehicle displayed on the inside surface of the right front pillar 12 do not differ from each other, which enables the driver to make appropriate judgments.

Further, since the location of the vehicle 2 after the predetermined period of time is predicted, and the blind spot region from the position is calculated based on that predicted location, it becomes possible to appropriately extract an image, which will show the peripheral circumstances of the vehicle 2 after the predetermined period of time, from the captured image.

Furthermore, since the image corresponding to the blind spot region created by the right front pillar 12 of the vehicle 2 is displayed on the inside of the right front pillar 12, driving capability is improved. Further, by the projection conversion on the virtual plane X, it becomes possible to form an image, as would be seen through the right front pillar 12, with more realism. Therefore, by visually recognizing the projected image, the driver can more accurately learn of dangers located in the blind spot.

Needless to say, the present invention is not limited to the aforementioned embodiment, and various improvements and modifications may be made without departing from the scope of the present invention.

For example, the foregoing embodiment is described as projecting an image corresponding to the blind spot region created by the right front pillar 12 onto on the inside surface of the right front pillar 12 using the projector 5, to thereby compensate for the lack of visibility of the blind spot, but the image corresponding to the blind spot region may instead be displayed on a display device mounted on the inside surface of the pillar in the vehicle.

Further, the image projection processing program (FIG. 6) may be executed only when the vehicle 2 approaches within a predetermined distance of an intersection or a curve. At this time, it is preferable to determine whether the vehicle 2 has come within the predetermined distance from the intersection or the curve by map matching with the navigation device. Further, the image projection processing program may be executed only when the recognition of the peripheral environment becomes important such as at an entrance/exit of a parking lot and a merging point of a road with an expressway, in addition to at an intersection and curve.

Further, as described above, the blind spot region generated by the right front pillar 12 to the side of the driver is displayed on the inside surface of the right front pillar 12, but, it is also possible to display a blind spot region created by a left front pillar on the side of a front passenger's seat. In such a case, the camera is mounted on the exterior of the left front pillar, and an image extracted from a captured image range is displayed on the inside surface of the left front pillar.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving support device, comprising:
   an imaging unit which captures an image of a peripheral area of a vehicle;

a traveling state obtaining unit for obtaining, as a traveling state of the vehicle, vehicle direction and distance traveled or vehicle direction and vehicle speed detected by sensors provided in the vehicle;

a location predicting unit which predicts a location of the vehicle at the end of a predetermined period of time, based on the obtained traveling state of the vehicle;

a blind spot region calculating unit which calculates a blind spot of the vehicle as it will exist at the predicted location;

an image extracting unit for extracting an image from the captured image based on the obtained traveling state of the vehicle, the extracted image corresponding to a blind spot region of the vehicle as it will exist after the predetermined period of time; and an image outputting unit for outputting the extracted image.

2. The driving support device according to claim 1, wherein the predetermined period of time is a period of time from when the image of the peripheral area is captured by the imaging unit to when the captured image is output by the image outputting unit.

3. The driving support device according to claim 2, wherein the image extracting unit extracts the image corresponding to a blind spot region created by a pillar of the vehicle; and the image outputting unit outputs the extracted image for display on an interior surface of the pillar of the vehicle.

4. The driving support device according to claim 1, wherein the image extracting unit extracts the image corresponding to a blind spot region created by a pillar of the vehicle; and the image outputting unit outputs the extracted image for display on an interior surface of the pillar of the vehicle.

5. A driving support method, comprising:

capturing an image of an area on the periphery of a vehicle;

detecting vehicle direction and distance traveled or vehicle direction and vehicle speed, as a detected traveling state of the vehicle, based on results of detection performed by sensors provided in the vehicle;

predicting a location of the vehicle after a predetermined period of time based on the detected traveling state of the vehicle;

calculating a blind spot region of the vehicle as it will exist at the predicted location;

extracting an image from the captured image, the extracted image corresponding to the blind spot region of the vehicle as it will be after the predetermined period of time; and outputting the extracted image.

* * * * *